United States Patent

Ahmed

[11] Patent Number: 5,872,431
[45] Date of Patent: Feb. 16, 1999

[54] EFFICIENT POWER TRANSFER IN ELECTRONIC BALLAST

[76] Inventor: Zahir M. Ahmed, 30024 Via Rivera, Rancho Palos Verdes, Calif. 90274

[21] Appl. No.: 722,370

[22] Filed: Sep. 27, 1996

Related U.S. Application Data

[63] Continuation-in-part of Ser. No. 387,261, Feb. 13, 1995, Pat. No. 5,585,700.

[51] Int. Cl.$^6$ ..................................... G05F 1/00
[52] U.S. Cl. ......................... 315/307; 315/308; 315/291; 315/219
[58] Field of Search .................... 315/307, 308, 315/291, 219

[56] References Cited

U.S. PATENT DOCUMENTS

| | | | |
|---|---|---|---|
| 5,001,386 | 3/1991 | Sullivan et al. | 315/219 |
| 5,185,560 | 2/1993 | Nilssen | 315/219 |

OTHER PUBLICATIONS

Second Generation Power Factor Controller, LX1562/1563, Linfinity Electronics, Garden Grove, CA, pp. 1–22.
Bipolar Transistors Excel in Off–Line Resonant Converters, Motorola Semiconductor Products Inc., Phoenix, AZ, pp. 1–8.
Design Tips, Simple Electronic Ballast Using IR2155 MOS Gate Driver DT–94–3, International Rectifier, Peter N. Wood & Gerry Limjuco, pp. 1 and 2.
Hexfets Improve Efficiency, Expand Life of Electronic Lighting Ballast, AN–973, International Rectifier, El Segundo, CA, pp. 1–7.
Electronic Ballasts Using the Cost–Saving IR2155 Driver, International Rectifier, AN–995, Peter Wood, pp. 1–9.
Electronic Ballast, AR 180, Motorola, AZ, pp. 1–6.
Rapid–Start–Types–Dimensional and Electrical Characteristics, American National Standards Institute ANSI, C78.1–1991, pp. 1–85.

*Primary Examiner*—Frank G. Font
*Assistant Examiner*—Reginald A. Ratliff
*Attorney, Agent, or Firm*—Blakely Sokoloff Taylor & Zafman

[57] ABSTRACT

An electronic ballast for one or more F32T8 or F25T8 or F17T8 fluorescent lamps has a new design tool for efficient transfer of power to the lamp or the lamps. The design tool is constructed from the ballast DC voltage and the commercially available lamp specifications by the manufacturers or from the American National Standards (ANSI). This design tool is shown below:

$$F \times C = \frac{\sqrt{\frac{K^2 W^2}{V_1^2} - \frac{V_0^2}{R_0^2}}}{2\pi V_1}$$

where W=Lamp rating in watts,
$V_0$=Lamp voltage.
$V_1$=Electronic Ballast DC voltage,
$R_0$=Lamp Impedance in ohms, (ANSI C78.1-1991).
k=Empirical constant=1.5 to 10.0.

2 Claims, 3 Drawing Sheets

EFFICIENT POWER TRANSFER IN ELECTRONIC BALLAST

This a continuation-in-part application of application Ser. No. 08/387,261 filed Feb. 13, 1995, now U.S. Pat. No. 5,585,700.

SUMMARY OF INVENTION

For efficient power transfer in an electronic ballast for gas discharge lamps such as fluorescent lamps, the product of the frequency of the voltage across the lamp and the capacitor value across the lamp is a constant.

F×C=Constant (K), where

C=capacitance across the lamp.

F=frequency of sine wave voltage across the lamp terminals.

K=a fixed number derived from the lamp specifications as stated in the American National Standard, ANSI 78.11991, and the ballast DC voltage applied to the lamp circuit to generate the high frequency sine wave.

If a frequency is selected, then there is only one value of capacitor which will transfer power to the lamp with the least power loss in the ballast circuit. Or, if a capacitor value is selected, the above equation gives the allowable frequency for efficient power transfer.

The above stated relationship and equation is a design tool for the efficient design of an electronic ballast where the circuit configuration includes a high-frequency, low loss capacitor across the lamp. Although the concept of using a capacitor across a lamp for the generation of a sine wave across a load is known, the above stated design tool is considered an invention due to the following facts:

1. The above design tool is constructed from the lamp and ballast power supply specifications.
2. To the best of the knowledge of the applicant, the above invented design tool has not been published in any paper as of this date.
3. From the published information on gas discharge lamps known to the applicant, the above design tool or design procedure for efficient electronic ballast, F×C=a fixed number derived from the lamp parameters and ballast voltage, is not obvious.
4. The above stated design improvement tool has been specifically constructed for the electronic ballast for F32T8, F25T8, and F17T8 fluorescent lamps.

The integrated schematic as shown in FIG. 1 is considered unique due to the fact that no such schematic exists in completeness or in its entirety, for an electronic ballast for use on F32T8, F25T8, and F17T8 fluorescent lamps, as known to the applicant. A few sections of the schematic have been published, conceptually, independently, and piecewise. Examples: the boost converter, resonant circuit, and EMI filter. But to the applicant's best knowledge, the entire schematic, integrated for the electronic ballast specified, does not exist.

DETAILED DESCRIPTION

Figure 1A:
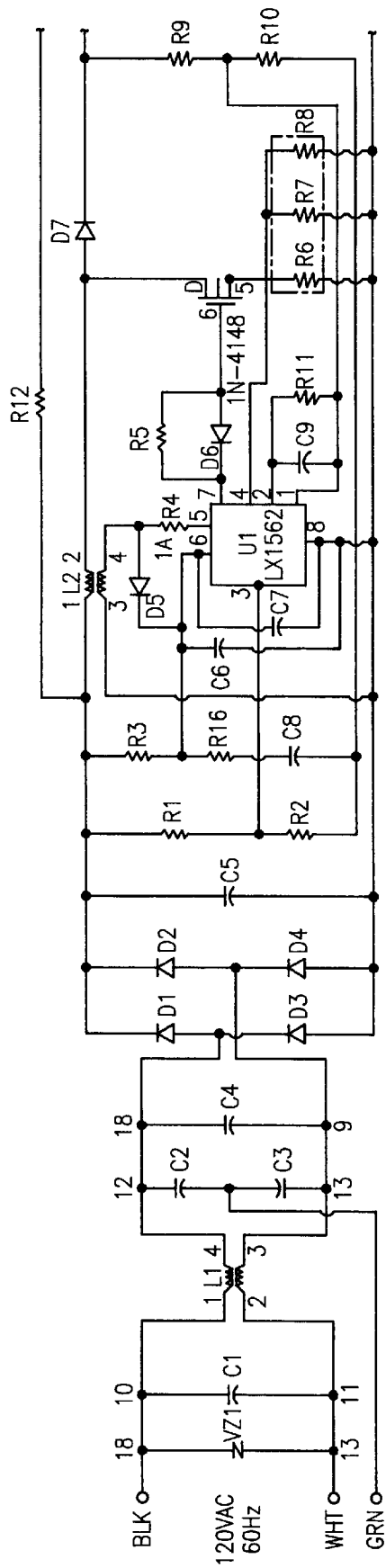
FIG. 1a is a schematic diagram showing a portion of the invented circuit.

An electronic ballast for gas discharge lamps, in general, and for F32T8, F25T8, and F17T8 fluorescent lamps, in particular, the said ballast comprising of:

a: A polypropylene high-frequency capacitor C15 across each lamp, the capacitor value being controlled by the relationship: Frequency multiplied by the capacitance is a fixed number for a certain type of lamp. The fixed number is derived from the specifications as stated in American National Standard ANSI 78.1-1991.

The equation:

$$F \times C = \frac{\sqrt{\frac{K^2 W^2}{V_1^2} - \frac{V_0^2}{R_0^2}}}{2\pi V_1}$$

where W=lamp rating in watts $V_1$=electronic ballast DC voltage $V_0$=lamp voltage rating, rms.

$R_0$=lamp impedance in ohms, derived from ANSI standard

K=empirical constant=1.5–10.0

With any frequency selected, the capacitor value is fixed for efficient power transfer.

b: One side of the capacitor connected to terminal #1 of the lamp 1, and terminal #2 is connected to one side of the choke L3, whose inductance is fixed for the frequency selected for efficient power transfer.

c: The other side of said inductor L3 is connected to a DC blocking capacitor C14 which in turn is connected to switching MOS Field Effect Transistors Q2 and Q3.

d: The other side of said capacitor is connected to terminal #3, on the opposite side of the lamp 1.

e: Terminal #4 of said lamp is connected to the ballast terminal, #6.

f: The same connections apply to lamp #2, lamp #3, and so on. There is no limit to the number of lamps connected in parallel except for the power capability of the ballast.

g: The switching transistors Q2, Q3 of any type are supplied by a regulated boost power supply connected between terminals 14, 15, 16, and 17 of output voltage V1.

h: The switching transistors Q2, Q3, when of the MOSFET type, are driven by the integrated circuit IR 2151, IR 2155, or equivalent.

i: The boost power supply (L1, C1, C2, C3 and C4) receives power from one of the following power utility lines.

j: 120 v 60 Hz, 220 v 50/60 Hz, or 277 v 50/60 Hz can be used to provide the rectified output for the boost regulator which in turn corrects the power factor using an integrated circuit to shape the current wave form to follow the voltage wave form.

k: An EMI filter is connected between terminals 8, 9, 10, 11, 12 and 13 and includes a common mode choke, L1.

l: A line transient protector VZ1 is connected between terminals 18 and 19.

The black and white wires leading from the ballast are connected to a single-phase 120 v 60 Hz line through a switch (not shown), while the green wire is connected to the earth terminal (refer to schematic). The surge absorber, VZ1, clamps any unusual voltage transients exceeding 150 volts and protects the components of the ballast from damage. The clipper VZ can absorb 4500 amps without damage. Transients of this magnitude are extremely rare.

Next, the EMI filter consists of a front-end AC capacitor C1, a common mode inductor L1, two line-to-earth ground high frequency capacitors C2 and C3, and an AC capacitor C4 across the AC line just before the rectifier bridge. This entire filter will reduce the conducted emission on the AC line as required by FCC regulations.

The rectifier bridge CR1-4 (D1–D4), provides a rectified output to the power factor correction boost regulator. The rectifier bridge is further protected by the AC polyester capacitor C5 which filters the switching noise from the power factor boost regulator. The boost regulator inductor L2 switched by the transistor Q1 provides higher DC voltage than the average input voltage. The integrated circuit U1 functions as a power factor corrector as well as a voltage regulator component.

The regulated output voltage is then switched into the resonant circuit L3 and C15 which provide sufficient sine wave peaks to ionize the lamp 1 and strike the arc. When the arc is established, the damping factor of the resonant circuit increases enough to supply the desired electrical power into the lamp, based upon the impedance of the lamp. The damping factor is a function of the capacitor C15 selected as per the stated design method described above.

The fifteen microsecond period of the sine wave and 0.0047 microfarad capacitance across the lamps conform to the invented design tool which provide the required power to the lamp and minimize the volt amperes shunted by the capacitor C15.

However, if the capacitor value is increased, for example, to 0.01 microfarad and frequency is unchanged, the new capacitor value will draw twice the current, which means much higher watts from the boost regulator for the same power consumption by the lamp. Thus, the ballast would be inefficient.

The above design tool is unique because the frequency of the lamp voltage and the capacitor value across it are interdependent for efficient power transfer to the lamp. Efficiency is the prime factor in energy saving schemes of electronic ballast. The above equation brings a new methodology in the design of the most efficient electronic ballast for each gas discharge lamp type.

This ballast design does not use transformers either at the 120 v 60 Hz side, or at the output side. To the best of applicant's knowledge, there does not exist an electronic ballast without input, output, or both transformers, used for F32T8, F25T8, F17T8, or other lamps not known to the applicant.

However, the concept of not using transformers at the input or output has been published. These publications, nevertheless, do not specify the ballast for F32T8, F25T8, F17T8 lamps, and further, do not state the efficient energy transfer as disclosed herein. In the present disclosure, the efficient energy transfer design equation is locked with transformerless configurations.

This efficient design technique combined with transformerless circuitry, along with the use of integrated circuit chips to generate sinewaves and correct powerfactor, has made this ballast electronic design unique. Due to the nature of the circuit design, the open circuit voltage when the lamp is not connected, is not more than 230 volts for the 120 Volts, 60 Hz ballasts for F32T8, F25T8 and F17T8 lamps. Usually, the open circuit voltage for ballasts with disconnected lamps is more hazardous in the range of 450 volts to 600 volts. The design tool is applicable to one or more lamps connected in parallel with capacitors across each lamp.

Figure 1B:
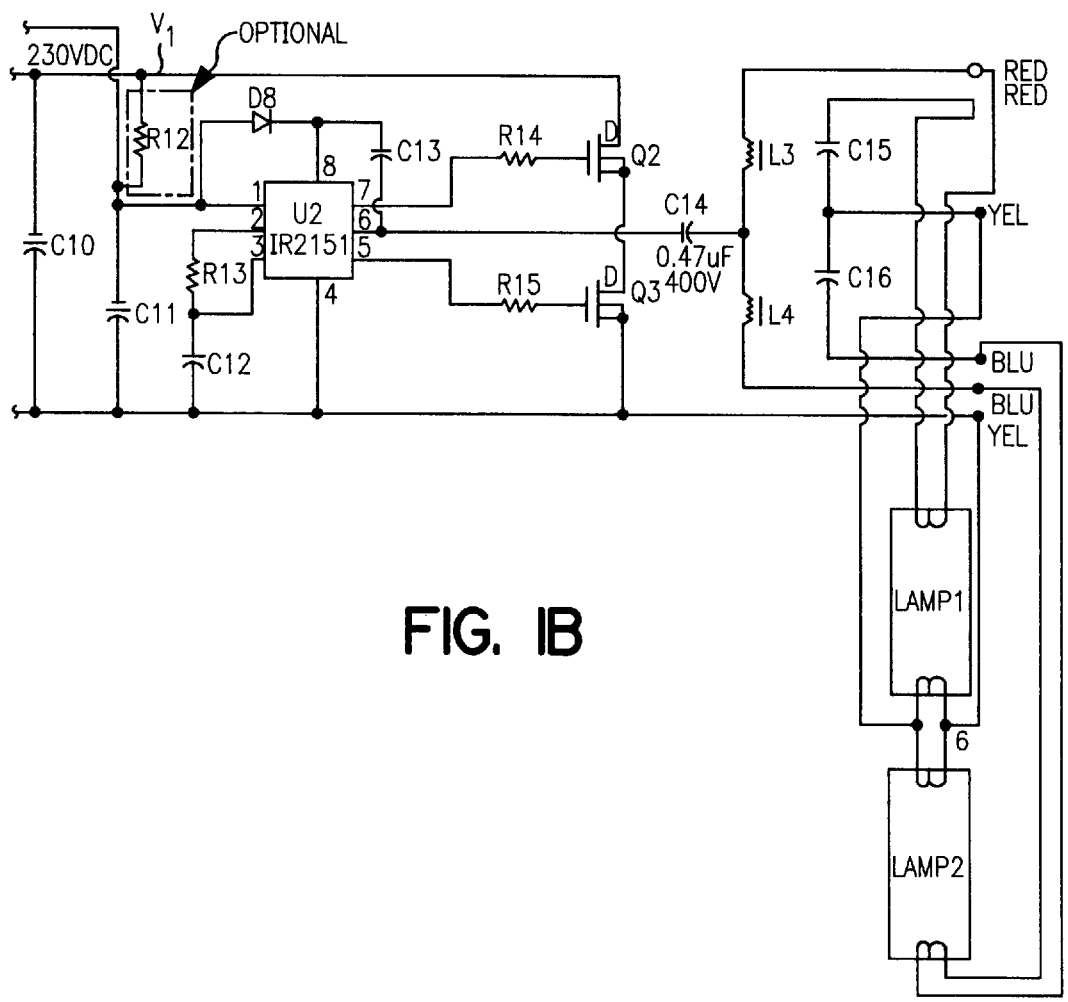
FIG. 1b is a schematic diagram showing the remaining portion of the invented circuit.
Figure 1C:
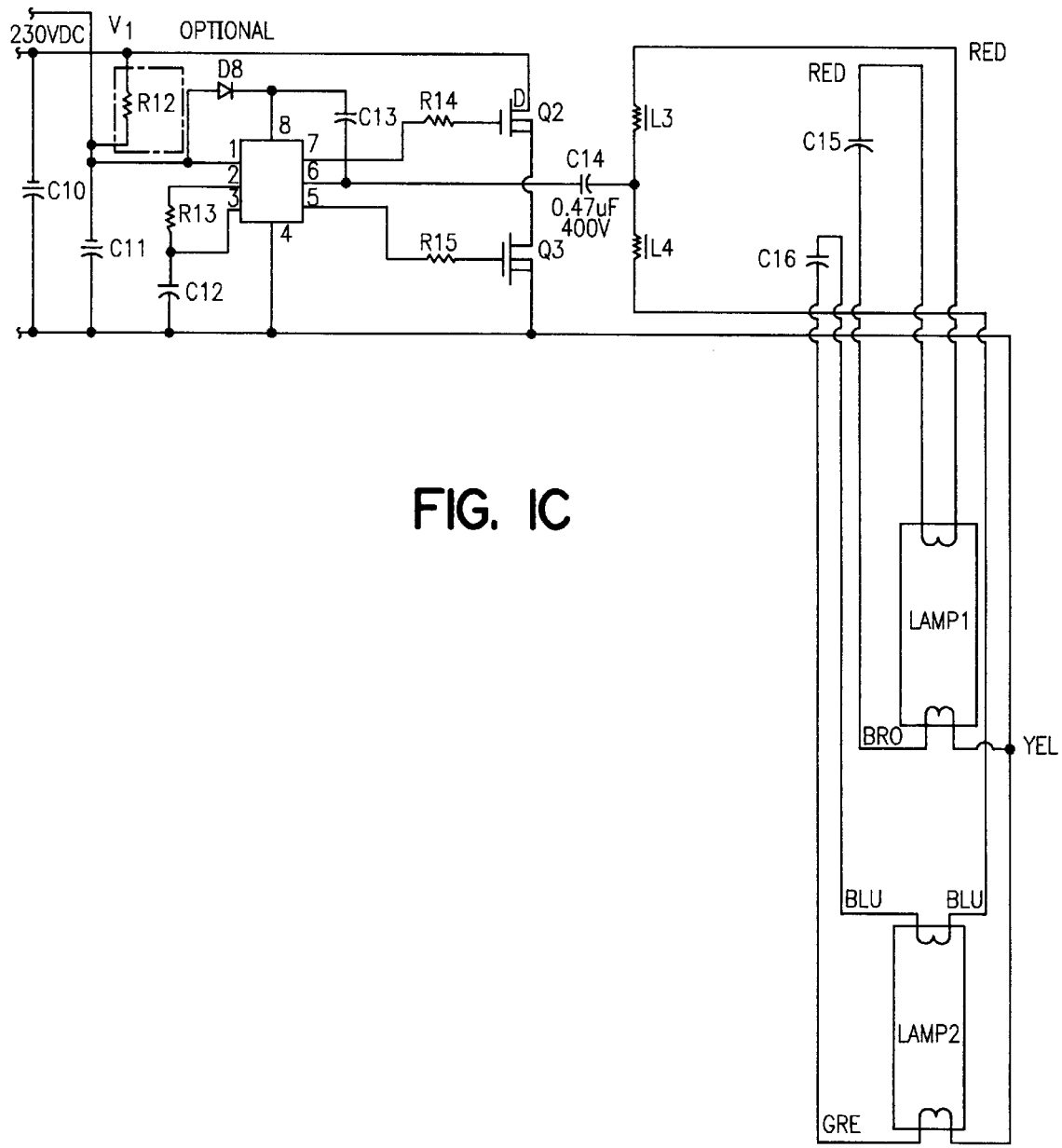
FIG. 1c is a schematic diagram showing an alternate embodiment of the portion of the invented circuit shown in FIG. 1b.

In the invented ballast, if more than one lamp is connected, one way of connecting the lamps is shown in FIG. 1B. However, since the invented design does not use isolation transformers, if one of the lamps is disconnected at one end, then there may be leakage from that end to ground thereby creating a safety hazard. In this connection, the lamp connections shown in FIG. 1C provides connections which isolate the lamps from one another which prevents leakage to ground if one end of either lamp is disconnected. The connections shown in FIG. 1C may be extended to cover additional lamps.

I claim:

1. A ballast for coupling to at one fluorescent lamp comprising:

a) circuitry means coupled to a source of alternating current for generating a sine wave having a frequency F;

b) at least one capacitor having a capacitance C coupled in parallel to a corresponding one of said at one fluorescent lamp and to said circuitry means, such that F and C satisfy the equation:

$$F \times C = \frac{\sqrt{\frac{K^2 W^2}{V_1^2} - \frac{V_0^2}{R_0^2}}}{2\pi V_1}$$

where W=specified wattage of the lamp
   $V_1$=applied DC voltage of the ballast
   $V_0$=a predetermined lamp voltage
   $R_0$=a predetermined lamp impedance
   K=empirical constant in the range of 1.5–10.0.

2. A ballast for coupling to at least two fluorescent lamps comprising:

a) circuitry means coupled to a source of alternating current for generating a sine wave having a frequency F;

b) a plurality of capacitors having a capacitance C, each coupled in parallel to a corresponding one of said at least two fluorescent lamps and to said circuitry means, such that F and C satisfy the equation:

$$F \times C = \frac{\sqrt{\frac{K^2 W^2}{V_1^2} - \frac{V_0^2}{R_0^2}}}{2\pi V_1}$$

where W=specified wattage of the lamp
   $V_1$=applied DC voltage of the ballast
   $V_0$=a predetermined lamp voltage
   $R_0$=a predetermined lamp impedance
   K=empirical constant in the range of 1.5–10.0,
   wherein one end of each of said capacitors is coupled to a first terminal at a first end of its corresponding fluorescent lamp, and a second end of each of said capacitors is coupled to a first terminal at a second end of its corresponding fluorescent lamp, and a second terminal at said second end of said corresponding fluorescent lamp is coupled to a corresponding second terminal at a second end of an adjacent one of said at least two fluorescent lamps.

* * * * *